(12) United States Patent
Parizhsky et al.

(10) Patent No.: US 8,649,264 B2
(45) Date of Patent: Feb. 11, 2014

(54) IP FLOW-BASED LOAD BALANCING OVER A PLURALITY OF WIRELESS NETWORK LINKS

(75) Inventors: Vladimir Parizhsky, New York, NY (US); Richard J. Dynarski, Freehold, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 11/695,830

(22) Filed: Apr. 3, 2007

(65) Prior Publication Data

US 2008/0084819 A1 Apr. 10, 2008

Related U.S. Application Data

(60) Provisional application No. 60/828,189, filed on Oct. 4, 2006.

(51) Int. Cl.
*G01R 31/08* (2006.01)
(52) U.S. Cl.
USPC .......................................................... 370/230
(58) Field of Classification Search
USPC ......... 370/235, 348, 407, 222, 457, 350, 225, 370/353, 229, 328–329, 352, 389, 395.1, 370/400, 401, 402, 354–357, 360, 230–231, 370/310, 335–336; 709/226
See application file for complete search history.

(56) References Cited

U.S. PATENT DOCUMENTS

| | | | |
|---|---|---|---|
| 6,006,264 A * | 12/1999 | Colby et al. ................... 709/226 |
| 6,339,706 B1 * | 1/2002 | Tillgren et al. ............... 455/419 |
| 6,449,251 B1 | 9/2002 | Awadallah et al. |
| 6,865,185 B1 * | 3/2005 | Patel et al. ..................... 370/412 |
| 6,920,121 B2 * | 7/2005 | Tan ................................ 370/329 |
| 7,027,400 B2 * | 4/2006 | O'Neill .......................... 370/235 |
| 7,787,517 B2 | 8/2010 | Mantravadi et al. |
| 2002/0054567 A1 * | 5/2002 | Fan ................................ 370/230 |
| 2003/0043773 A1 | 3/2003 | Chang |
| 2003/0202469 A1 * | 10/2003 | Cain .............................. 370/230 |
| 2004/0004958 A1 * | 1/2004 | Wang ............................. 370/352 |
| 2004/0082311 A1 * | 4/2004 | Shiu et al. ...................... 455/403 |
| 2005/0243835 A1 * | 11/2005 | Sharma et al. ............ 370/395.42 |

(Continued)

FOREIGN PATENT DOCUMENTS

| JP | 2000216815 A | 8/2000 |
|---|---|---|
| JP | 2003209554 A | 7/2003 |

(Continued)

OTHER PUBLICATIONS

Taiwan Search Report—TW096137312—TIPO—Jun. 17, 2011.

(Continued)

*Primary Examiner* — Yemane Mesfin
*Assistant Examiner* — Samina Choudhry
(74) *Attorney, Agent, or Firm* — Donald C. Kordich

(57) ABSTRACT

Systems and methodologies are described that facilitate assigning a flow (e.g., IP flow) to a wireless network link from a bundle that includes a plurality of wireless network links. Assignments can be based upon characteristics associated with the flow and characteristics associated with the links. For example, a service class corresponding to the flow can be evaluated to determine flow related characteristics. Moreover, link related feedback can be analyzed to determine characteristics of the links.

23 Claims, 11 Drawing Sheets

(56) References Cited

U.S. PATENT DOCUMENTS

| | | | |
|---|---|---|---|
| 2006/0178153 A1* | 8/2006 | Tenny et al. | 455/450 |
| 2007/0025293 A1* | 2/2007 | Choi | 370/331 |
| 2007/0116139 A1* | 5/2007 | Subramanian et al. | 375/260 |
| 2008/0200195 A1 | 8/2008 | Abe et al. | |
| 2009/0252049 A1* | 10/2009 | Ludwig et al. | 370/252 |

FOREIGN PATENT DOCUMENTS

| | | |
|---|---|---|
| JP | 2006512800 A | 4/2006 |
| WO | WO2005117473 A1 | 12/2005 |
| WO | WO2006102462 | 9/2006 |

OTHER PUBLICATIONS

International Search Report and Written Opinion—PCT/US2007/080397, International Search Authority—European Patent Office—Mar. 25, 2008.

S. Conversy and J-D. Fekete; "The svgl toolkit, enabling fast rendering of rich 2D graphics" Technical Report-Ecole Des Mines De Nantes, No. 02/01/info, 2002, pp. 1-11, XP002539626 France.

* cited by examiner ial Application No. 60/60/828,189 entitled "Flow Split-
IP FLOW-BASED LOAD BALANCING OVER A PLURALITY OF WIRELESS NETWORK LINKS

CLAIM OF PRIORITY UNDER 35 U.S.C. §119

The present application for patent claims priority to Provisional Application No. 60/60/828,189 entitled "Flow Splitting" filed Oct. 4, 2006, and assigned to the assignee hereof and hereby expressly incorporated by reference herein.

BACKGROUND

I. Field

The following description relates generally to wireless communications, and more particularly to flow-based load balancing in a wireless communication environment.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Each mobile device can communicate with one or more base stations via transmissions on forward and reverse links. Forward links (or downlinks) refer to communication links from base stations to mobile devices, and reverse links (or uplinks) refer to communication links from mobile devices to base stations. According to an example, a mobile device can connect to a wireless network over multiple links (e.g., uplinks and downlinks). Load balancing techniques oftentimes can be employed to spread data transfer loads across these multiple links. These load balancing techniques are commonly static in nature. For example, a round-robin packet by packet link selection can be utilized where a first packet traverses over a first link, a second packet traverses over a second link, a third packet traverses over a third link, and so forth. Further to this example, packets can be assigned to links in a manner without accounting for quality of the links. According to another illustration, hashing based selection can utilize an IP source/destination address without rebalancing on hashing collision. Thus, if most source/destination pairs hash onto a first link, minimal load balancing is provided. Pursuant to another example, conventional load balancing techniques can segment a packet into N different frames on one side of the link, and reassemble the frames at the other end. However, extra information is typically included in each frame in order to reconstruct the packet on the receiving side of the link. Thus, typical load balancing techniques oftentimes spread load unequally across links, fail to account for link quality (e.g., which commonly varies for wireless links), and/or transmit overhead data causing inefficient utilization of limited bandwidth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating assignment of a flow (e.g., IP flow) to a wireless network link from a bundle that includes a plurality of wireless network links. Assignments can be based upon characteristics associated with the flow and characteristics associated with the links. For example, a service class corresponding to the flow can be evaluated to determine flow related characteristics. Moreover, link related feedback can be analyzed to determine characteristics of the links.

In accordance with an aspect, a method that facilitates allocating flows to links within a wireless communication environment, comprises: evaluating a service class related to a flow to determine flow characteristics; analyzing feedback from links in a bundle to identify link characteristics; and dynamically assigning the flow to a selected link from the bundle based upon the flow characteristics and the link characteristics.

In another aspect, a wireless communications apparatus, comprises: a memory that retains instructions related to determining flow characteristics by assessing a service class of a flow, identifying link characteristics from feedback of links in a bundle, and allocating the flow to a particular link from the bundle based upon the flow characteristics and the link characteristics; and a processor, coupled to the memory, configured to execute the instructions retained in the memory.

According to yet another aspect, a wireless communications apparatus that enables assigning flows to links to dynamically balance load within a wireless communications environment, comprises: means for identifying characteristics of a flow based upon a service class related to the flow; means for determining characteristics of links in a bundle based upon obtained link related feedback; and means for allocating the flow to a selected link based upon the characteristics of the flow and the links.

In another aspect, a machine-readable medium has stored thereon machine-executable instructions for: analyzing a service class related to a flow to determine flow characteristics; evaluating feedback from links in a bundle to identify link characteristics; and assigning the flow to a selected link from the bundle based upon the flow characteristics and the link characteristics.

According to an aspect, an a wireless communication system, an apparatus comprises: a processor configured to: identify characteristics of a flow based upon a service class related to the flow; determine characteristics of links in a bundle based upon obtained link related feedback; and assign the flow to a selected link based upon the characteristics of the flow and the links.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
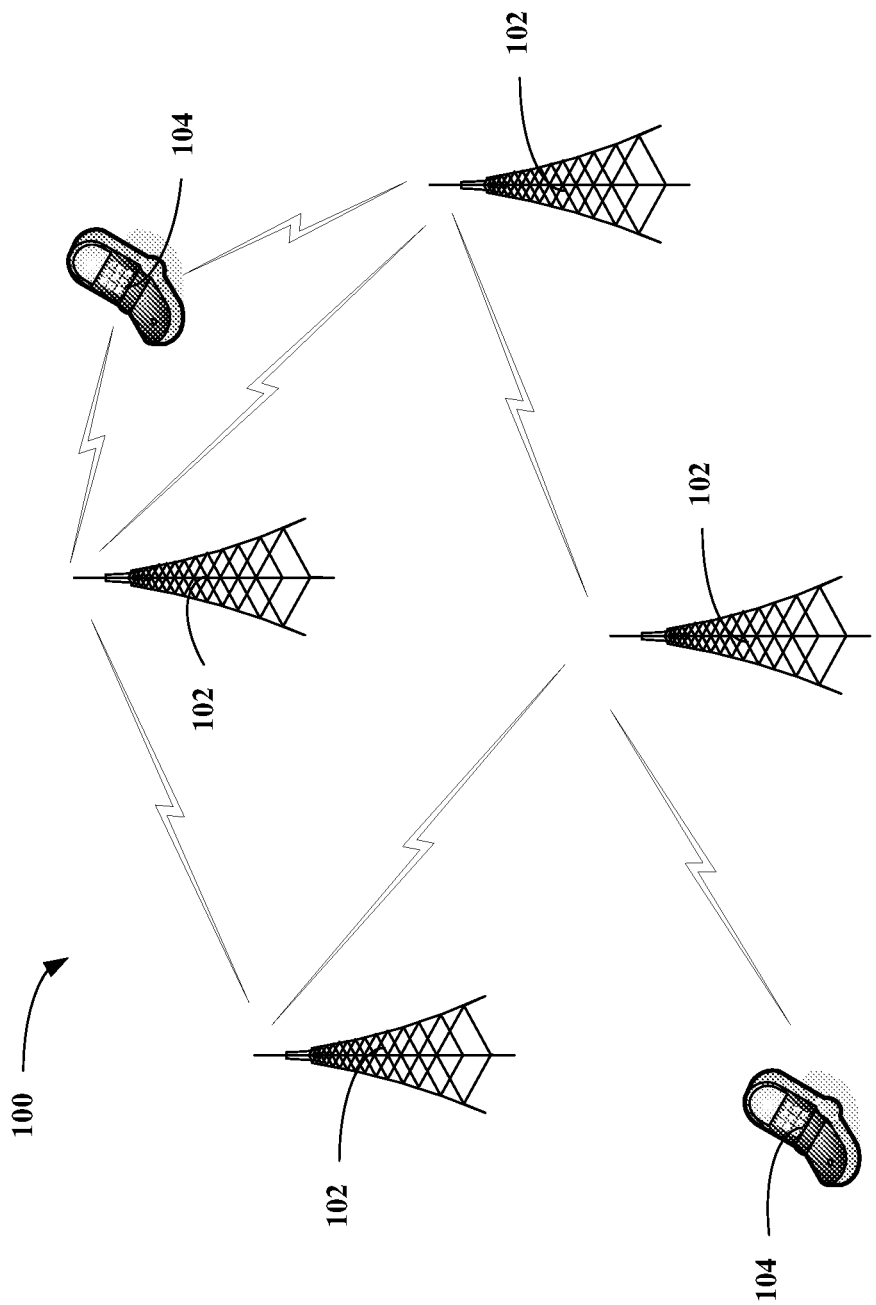
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100.

Base stations 102 can each communicate with one or more mobile devices 104. Base stations 102 can transmit information to mobile devices 104 over forward links (downlinks) and receive information from mobile devices 104 over reverse links (uplinks). Mobile devices 104 can be connected to the wireless network (e.g., one or more base stations 102) over multiple links (e.g., uplinks and/or downlinks) utilizing a bundle. A bundle can include multiple different links. According to an example, the wireless network (e.g., one or more base stations 102) can select link(s) within the bundle to utilize to transmit a packet to a particular one of the mobile devices 104. By way of another illustration, a similar selection can be effectuated by mobile devices 104 to determine link(s) from the bundle to employ for transferring a packet to the wireless network (e.g., a destination base station 102).

A source can employ flow-based load balancing to elect link(s) over which data can be communicated to a destination. By way of example, the source can be a base station 102, a mobile device 104, a node within a network (not shown), etc. and the destination can be a mobile device 104, a base station 102, a node within a network, and the like. Flow-based load balancing can provide more consistent load balancing as compared to conventional static load balancing techniques, and consequently, higher throughput can be yielded.

A flow (e.g., Internet Protocol (IP) network flow) can include any number of packets that can share any number of properties (e.g., substantially similar source, destination, protocol, . . . ). For example, a flow can be a combination of source/destination IP address, transport protocol (e.g., User Datagram Protocol (UDP), Transmission Control Protocol (TCP), Stream Control Transmission Protocol (SCTP), . . . ), source/destination port and can include values within the IP packet itself. System 100 can enable dynamically selecting and assigning (e.g., at base stations 102, mobile devices 104, a node within a network, . . . ) a flow to a certain link (and/or more than one link) from the bundle upon receipt of the first packet of the flow. Such assignments can be based upon characteristics of the flow and/or characteristics of the links (e.g., radio frequency (RF) characteristics).

Figure 2:
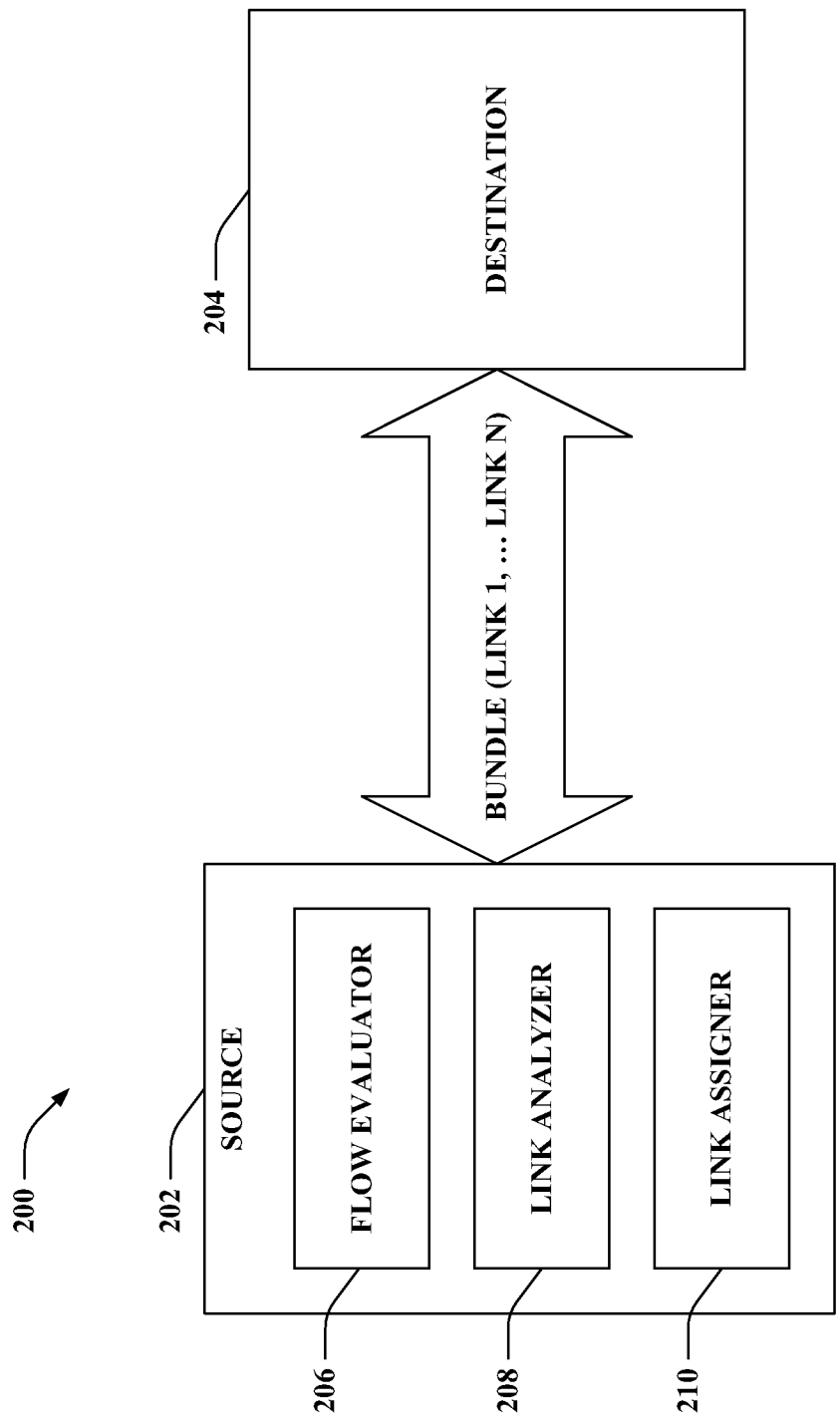
FIG. 2 is an illustration of an example system that enables IP flow-based load balancing of wireless network links.

Turning to FIG. 2, illustrated is a system 200 that enables IP flow-based load balancing of wireless network links. System 200 includes a source 202 that communicates with a destination 204. A bundle of links can enable transferring data between source 202 and destination 204. According to an example, the bundle can include N links, where N can be substantially any integer. By way of illustration, source 202 can transfer a set of packets that make up an IP flow to destination 204. Further to this illustration, source 202 can assign the IP flow to one or more links from the bundle. It is contemplated that source 202 can be a base station, a mobile device, a node within a network, etc. and destination 204 can be a mobile device, a base station, a node within a network, etc.

Source 202 can further include a flow evaluator 206, a link analyzer 208, and a link assigner 210. Flow evaluator 206 can analyze characteristics associated with an IP flow to be transmitted from source 202. Minimum bandwidth, maximum bandwidth, latency tolerance, loss tolerance, compression (e.g., whether compression is possible, type(s) of compression that can be employed, . . . ), etc. can be specified by a service class corresponding to the IP flow. Flow evaluator 206 can review the service class of the IP flow to identify these characteristics associated with the IP flow. For example, flow evaluator 206 can analyze the service class when source 202 assigns the flow to a link.

Link analyzer 208 can evaluate the links in the bundle to determine characteristics (e.g., RF characteristics, . . . ) of the links. Link analyzer 208 can assess quality of the links (e.g., quality metric), and these link qualities can be leveraged in connection with assigning IP flows to corresponding links. Link analyzer 208 can perform an analysis upon feedback associated with the links in the bundle. Link analyzer 208 can use a feedback loop from layer 2 (e.g., data link layer) and/or layer 1 (e.g., physical layer) to review characteristics of the links. According to an example, link analyzer 208 can determine characteristics of the links continuously, periodically (e.g., on the order of seconds), and the like. Link analyzer 208 can determine whether or not a particular link is misbehaving (e.g., evaluate whether the link is lossy, . . . ). Further, link analyzer 208 can assess bandwidth, throughput, traffic, scheduling, rate, and so forth associated with each of the links in the bundle.

Link assigner 210 can allocate an IP flow to a corresponding link (or links) from the bundle based upon the characteristics of the IP flow identified by flow evaluator 206 and the characteristics of the links discerned by link analyzer 208. For example, the flow characteristics and the link characteristics can be leveraged by link assigner 210 to assign transmission of the set of packets included in the IP flow to selected link(s). By way of illustration, link assigner 210 can assign higher bandwidth flows to links that can provide higher bandwidth. Accordingly, load balancing can be provided to optimize utilization of good and poor links. Further, link assigner 210 can effectuate allocating flows to links at layer 3 (e.g., IP layer, network layer, . . . ) based at least in part upon feedback obtained from layer 1 and/or layer 2 (e.g., feedback evaluated by link analyzer 208). By operating at layer 3, link assigner 210 can yield more reasonable allocation decisions (and/or scheduling and/or routing decisions) as compared to assignments effectuated from lower layers.

Link assigner 210 can dynamically allocate a flow to a link when the flow arrives at source 202. Thus, when a packet from the flow to be sent to destination 204 is obtained by source 202, link assigner 210 can allot a particular link to the packet as well as other packets in the flow. Accordingly, the packets of the flow can traverse over a common link (or a set of links if so allocated by link assigner 210).

RF link quality can vary; thus, links within the bundle can differ in quality. As such, lower quality links can result in lower throughput (e.g., diminished bandwidth) compared to higher quality links. Link analyzer 208 can employ link related feedback to assess quality associated with the links in the bundle. Further, IP flow characteristics determined by flow evaluator 206 can enable appropriate selection by link assigner 210 of a link for the IP flow. Moreover, since IP flows can have a sequencing requirement (e.g., packet 1 should arrive before packet 2, . . . ), assigning the packets of each IP flow to a particular link can enforce the sequencing and mitigate retransmissions that can happen due to the lower quality link caused packet delays.

Pursuant to an example, when a user is connected via multiple wireless links, the links oftentimes can have differing speeds due to typical radio network conditions. Flow based load balancing supported by system 200 can be utilized to allocate lower bandwidth or loss tolerant flows to links with corresponding qualities. Further, link assigner 210 can enhance similarity in loading of substantially equal cost links since link assigner 210 can select a link with availability. Moreover, by utilizing flow based load balancing, an impact associated with poor quality links on flows communicated from source 202 to destination 204 commonly encountered with static schemes can be mitigated.

Figure 3:
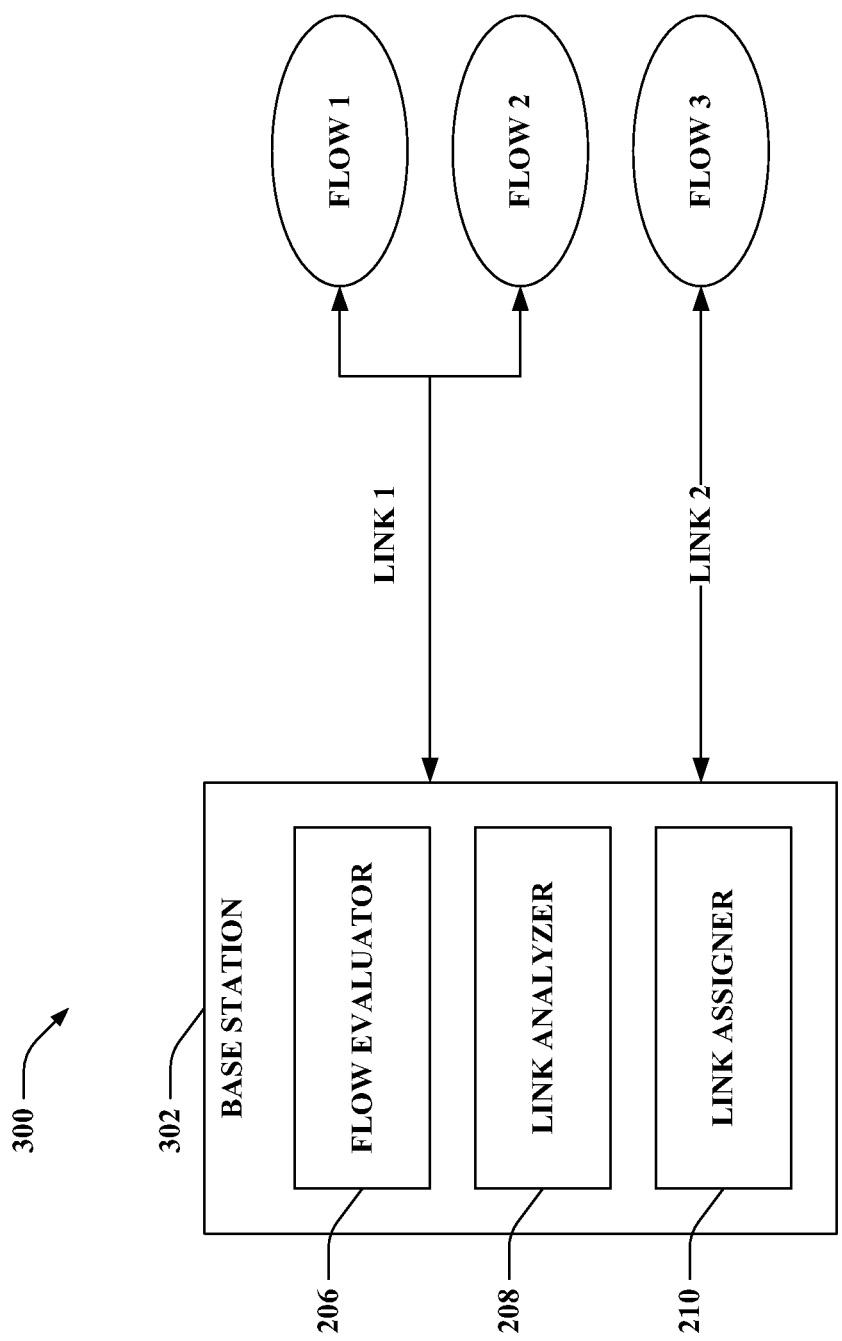
FIG. 3 is an illustration of an example system that allocates flows to links in a wireless communication environment.

Now referring to FIG. 3, illustrated is an example system 300 that allocates flows to links in a wireless communication environment. System 300 includes a base station 302 that can further comprise flow evaluator 206, link analyzer 208, and link assigner 210 as described above. Base station 302 can obtain any number of flows that can be transmitted to any number of destinations (e.g., mobile devices) over any number of links from a bundle of links. As shown, three flows (e.g., flow 1, flow 2, flow 3) and two links (e.g., link 1, link 2) are illustrated in the depicted example; however, it is contemplated that substantially any number of flows and links can fall within the scope of the hereto appended claims.

According to an example, flow evaluator 206 can assess a service class associated with each of the flows (e.g., flows 1-3) when a first packet of each of the flows arrives at base station 302 to determine flow characteristics related to bandwidth (e.g., minimum, maximum, . . . ), loss tolerance, and so forth. Link analyzer 208 can evaluate feedback obtained from each link in a bundle (e.g., link 1, link 2, . . . ) to determine lossiness of each of the links, traffic currently traversing via each of the links, link quality, and so forth. Link assigner 210 can employ characteristics determined by flow evaluator 206 and link analyzer 208 to allocate each flow to a selected link. Thus, as shown, link assigner 210 can assign flow 1 and flow 2 to link 1, while allocating flow 3 to traverse over link 2. Based upon the assignment, packets that form flow 1 and flow 2 are communicated over link 1 and packets included in flow 3 are transferred over link 2.

It is contemplated that flows 1-3 can be transmitted to any mobile devices. For example, flows 1-3 can each be directed to disparate mobile devices or a common mobile device. According to another illustration, two of the flows can be sent to a common mobile device and the third flow can be transmitted to a disparate mobile device. For instance, flows 1 and 2 can be transferred to a common mobile device and flow 3 can be communicated to a disparate mobile device, or flows 1 and 3 can be sent to a common mobile device that differs from that to which flow 2 is transmitted, etc. Thus, a single link can transfer one flow to a particular mobile device, a single link can provide more than one flow to the particular mobile device, or multiple links can be utilized to communicate a plurality of flows to the particular mobile device.

Pursuant to further example, link analyzer 208 can determine that link 1 is less lossy than link 2. Also, flow evaluator 206 can determine that flows 1 and 2 are less loss tolerant than flow 3 based upon review of the respective service classes. Thus, link assigner 210 can place the less loss tolerant flows 1 and 2 upon the less lossy link 1 and the more loss tolerant flow 3 upon the more lossy link 3. It is to be appreciated, however, that the claimed subject matter is not limited to the aforementioned example since any disparate number of links and/or flows can be utilized and any disparate characteristics of the links and flows can be analyzed for yielding assignments.

Additionally, link assigner 210 can reassign a flow. Link analyzer 208 can continue to monitor link quality subsequent to link selection by link assigner 210 (e.g., link analyzer 208 can obtain continuous, periodic, etc. feedback from the links in the bundle). Further, upon identifying a change in link quality, link assigner 210 can manipulate assignments. Thus, according to the depicted example, if link analyzer 208 determines that link 1 becomes more lossy, lacks adequate bandwidth for flow 1 (e.g., upon flow 2 being assigned to link 1, . . . ), and the like after assignment of flow 1 to link 1, link assigner 210 can reassign flow 1 to link 2 upon determining that link 2 is more appropriate. By enabling reassignment, system 300 can isolate a misbehaving link in a relatively short amount of time.

Figure 4:
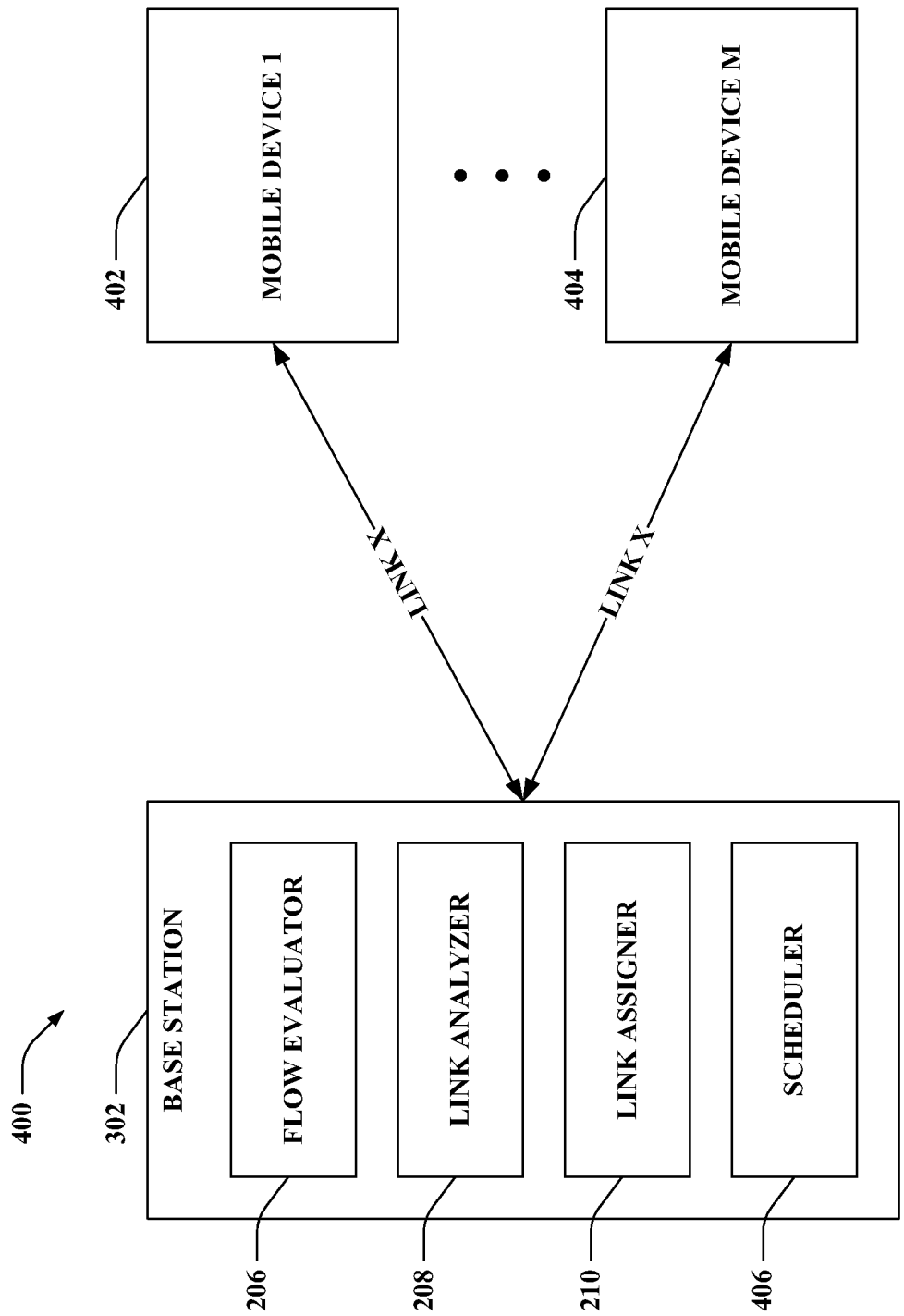
FIG. 4 is an illustration of an example system that enables sharing a link between multiple flows in a wireless communication environment.

Now referring to FIG. 4, illustrated is a system 400 that enables sharing a link between multiple flows in a wireless communication environment. System 400 includes base station 302 that can communicate with M mobile devices (e.g., mobile device 1 402, . . . , mobile device M 404) over a link X (e.g., from a bundle of links), where M can be substantially any integer. For instance, flows can traverse from base station 302 to corresponding mobile devices 402-404 via the link X. Additionally, base station 302 can communicate flows over any number of differing links from the bundle that includes link X to one or more of mobile devices 402-404 and/or any disparate mobile device(s) (not shown).

Base station 302 can include flow evaluator 206 to discern flow related characteristics, link analyzer 208 to determine link related characteristics, and link assigner 210 to allocate each flow to a corresponding link from the bundle based at least in part upon the flow related characteristics and/or link related characteristics. Further, base station 302 can include a scheduler 406 that enables flows to share a common link to which they are assigned. Thus, according to an example, a first flow from base station 302 to mobile device 1 402 and a second flow from base station 302 to mobile device M 404, as well as any number of additional flows directed to mobile device 1 402, mobile device M 404, and/or any differing mobile device(s), can be assigned by link assigner 210 to link X. Scheduler 406 can allot resources to each of the flows concurrently assigned to the common link (e.g., link X).

Scheduler 406 can utilize sharing weights corresponding to each user (e.g., associated with each of the mobile devices 402-404, each flow, . . . ) to schedule transmission of packets from a plurality of flows over a shared link (e.g., link X). The sharing weights can be employed by scheduler 406 to allocate portions of the overall available bandwidth associated with the shared link to mobile devices 402-404 occupying the link. Thus, if one flow is assigned to a link, the full bandwidth of the link can be leveraged for transferring the packets of the flow. However, when a plurality of flows are assigned to a common link, scheduler 406 evaluates the respective sharing weights to allot larger percentages of the overall bandwidth to flows associated with larger sharing weights in comparison to smaller percentages provided to flows with smaller sharing weights. For example, sharing weights can be related to subscriptions (e.g., level of service purchased), types of data (e.g., rich content, video, voice, . . . ), types of users (e.g., within a hierarchy of users), and so forth.

Moreover, link assigner 210 can consider sharing weights when making admission decisions. Thus, when link assigner 210 decides whether to place a flow upon a link, the sharing weight associated with the flow can be evaluated to determine whether packets in such flow will be able to be scheduled if assigned to such link. Accordingly, link assigner 210 can consider the sharing weight of the flow to be assigned and/or the sharing weights of the flows currently assigned to each link in connection with assigning flows to links.

Scheduler 406 can also enable yielding service level agreement reports. For instance, scheduler 406 can collect data related to an amount of bandwidth provided to each mobile device 402-404 for communicating flows over various links. The collected data can be aggregated with similar data collected from disparate base stations (not shown) (e.g., assembled at a disparate node within the wireless communication network (not shown)). Thereafter, reports can be generated based upon the aggregated data. Further, such data as well as subscription related information (e.g., level of service contract for various users) can be evaluated by link assigner 210 to allocate particular links for various flows and/or scheduler 406 for determining whether to provide bandwidth and/or fail to satisfy bandwidth requirements of a user.

Link assigner 210, in addition to considering characteristics yielded by flow evaluator 206 and link analyzer 208, can allocate links based upon disparate properties associated with mobile devices 402-404. For example, mobile devices 402-404 can be moving within a geographic region associated with base station 302. Thus, link assigner 210 can factor in movement of mobile devices 402-404 in connection with assigning flows communicated between mobile devices 402-404 and base station 302 to links. Link assigner 210 can preferentially allocate a flow to a particular link in the bundle based at least in part upon the movement (e.g., as a function of direction, speed, acceleration, location, . . . ). Further, based upon such movement, inferences can be made as to the likelihood of a link being broken within a predetermined period of time. Moreover, link assigner 210 can refrain from assigning a flow to a link based upon determining a high likelihood of breaking the link and/or multiple links (e.g., with disparate base stations) can be assigned to enable handing off. Additionally, it is contemplated that a flow can have redundant paths through a network; thus, packets of a critical flow can traverse multiple paths (e.g., links) to a destination to mitigate interruptions.

Figure 5:
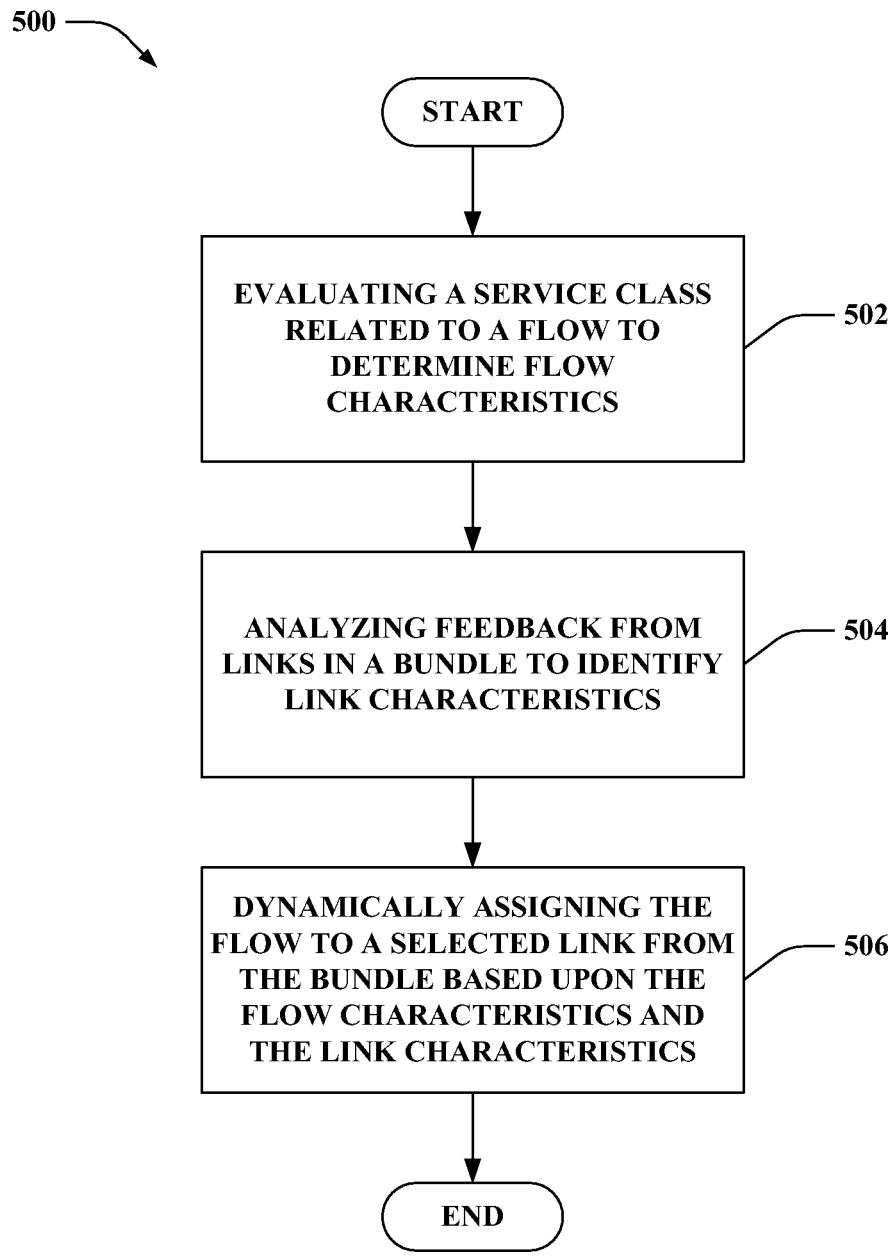
FIG. 5 is an illustration of an example methodology that facilitates allocating flows to links within a wireless communication environment.
Figure 6:
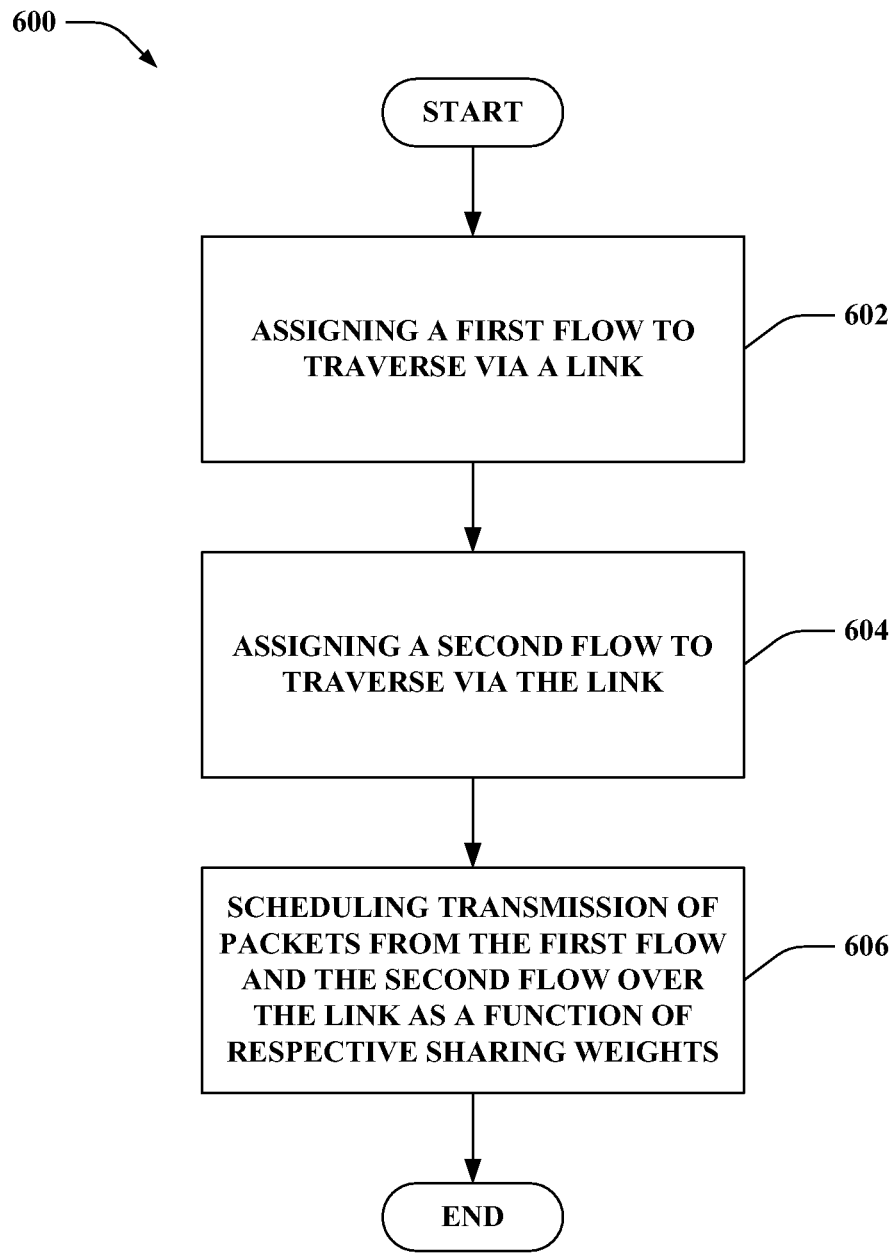
FIG. 6 is an illustration of an example methodology that facilitates coordinating transmission upon a link within a wireless communication environment.
Figure 7:
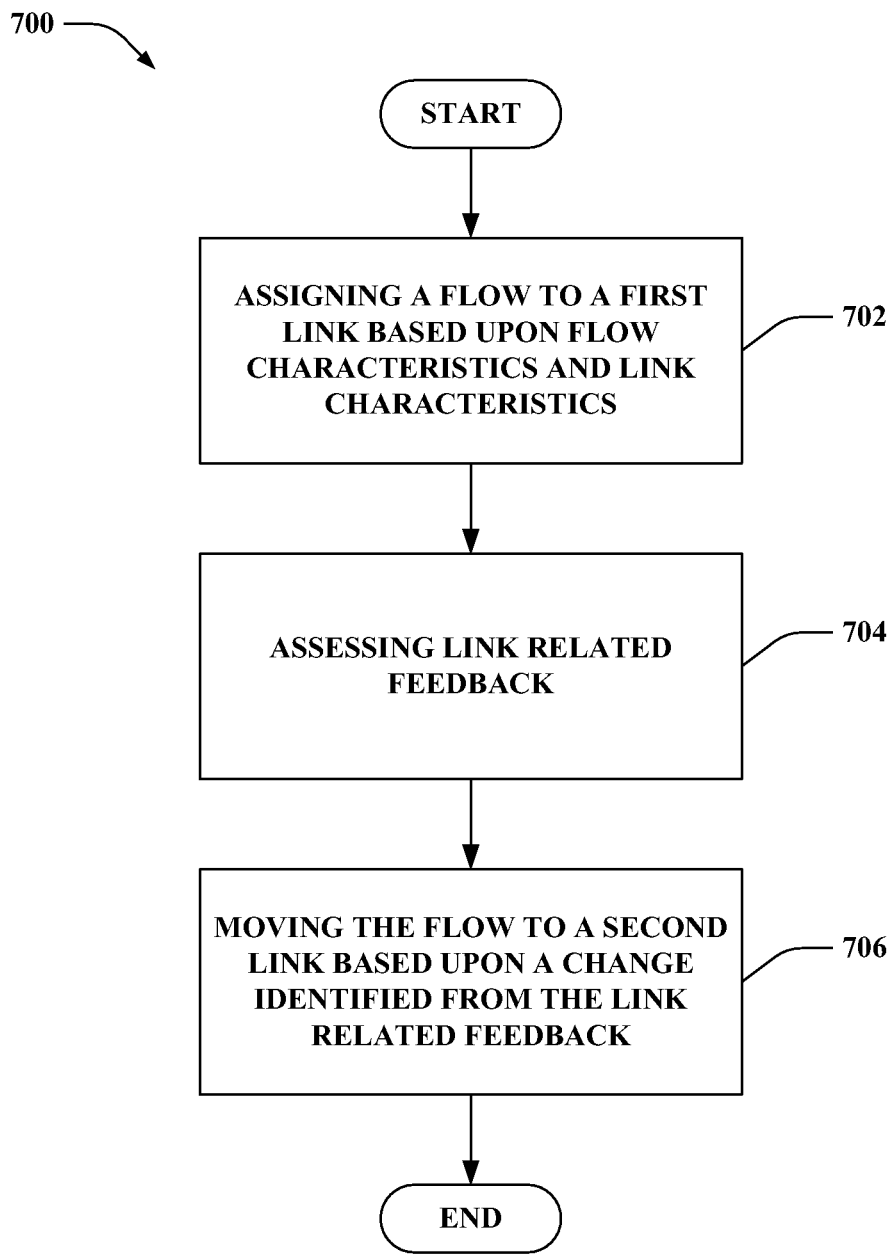
FIG. 7 is an illustration of an example methodology that facilitates monitoring links based upon obtained feedback.

Referring to FIGS. 5-7, methodologies relating to flow-based load balancing over a plurality of wireless network links are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Now turning to FIG. 5, illustrated is a methodology 500 that facilitates allocating flows to links within a wireless communication environment. At 502, a service class related to a flow can be evaluated to determine flow characteristics. The flow can include any number of packets that can share any number of properties (e.g., substantially similar source, destination, protocol, . . . ). Further, the flow can be associated with a corresponding service class. Moreover, evaluation of the service class can yield flow characteristics pertaining to minimum bandwidth, maximum bandwidth, latency tolerance, loss tolerance, compression, and the like. At 504, feedback from links in a bundle can be analyzed to identify link characteristics. The bundle can include any number of links, and each of the links can provide varying levels of quality. For instance, some links can provide high throughput, while others can provide low throughput. According to another illustration, a subset of the links in the bundle can be more lossy than a remainder of the links in the bundle. Feedback from the links can be assessed to determine link characteristics related to bandwidth, quality, throughput, traffic, scheduling, rate, and the like. Moreover, the feedback can be received and/or reviewed continuously, periodically, etc. At 506, the flow can be dynamically assigned to a selected link from the bundle based upon the flow characteristics and the link characteristics. Thus, packets included in the flow can traverse over the selected link to a destination. Retransmission associated with packets being obtained out of order when transferred over a plurality of links can accordingly be mitigated by transmitting the packets from the flow sequentially upon the selected link. Further, by dynamically assigning the flow based upon the flow characteristics and the link characteristics, loads within a network can be balanced between disparate links while satisfying properties associated with the flows.

Referring to FIG. 6, illustrated is a methodology 600 that facilitates coordinating transmission upon a link within a wireless communication environment. At 602, a first flow can be assigned to traverse via a link. At 604, a second flow can be assigned to traverse via the link. The assignments can be effectuated based upon evaluations of characteristics of the first and second flows as well as characteristics of available links. Thus, the first flow and the second flow can share the link. Further, it is contemplated that disparate flow(s) can be assigned to the link and/or differing link(s) within a bundle. At 606, transmission of packets from the first flow and the second flow can be scheduled over the link as a function of respective sharing weights. Each flow can be associated with a corresponding sharing weight. Further, the sharing weights can be utilized to allocate the overall available bandwidth (e.g., throughput) of the link. For example, a flow with a larger sharing weight can be scheduled with a larger proportion of the overall bandwidth in comparison to a flow with a smaller sharing weight; thus, the strength of a sharing weight a flow can be relative to sharing weights of other flows.

With reference to FIG. 7, illustrated is a methodology 700 that facilitates monitoring links based upon obtained feedback. At 702, a flow can be assigned to a first link based upon flow characteristics and link characteristics. At 704, link related feedback can be assessed. For example, the feedback can be obtained and/or evaluated continuously, periodically, etc. Moreover, the feedback can originate from layer 1 (e.g., physical layer) and/or layer 2 (e.g., data link layer). At 706, the flow can be moved to a second link based upon a change identified from the link related feedback. For example, increased lossiness associated with the first link can be identified from the feedback, and if the flow has a low loss threshold, it can be migrated to the second link, which can be less lossy. By way of another illustration, an increase in available bandwidth of the second link can be determined from the feedback, which can cause the transition. It is to be appreciated, however, that the claimed subject matter is not limited to the aforementioned examples.

It will be appreciated that, in accordance with one or more aspects described herein, inferences can be made regarding dynamically balancing loads across network links. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting links from a bundle to be assigned to flows. In accordance with another example, an inference can be made related to an expected change in link quality over time, which can be factored in to link assignments. According to a further example, an inference can be made pertaining to a likelihood of a link being broken based upon a current location, direction of travel, speed, etc. of a mobile device, and this likelihood can influence link allocations. It will be appreciated that the foregoing examples are illustrative in nature and are not intended to limit the number of inferences that can be made or the manner in which such inferences are made in conjunction with the various embodiments and/or methods described herein.

Figure 8:
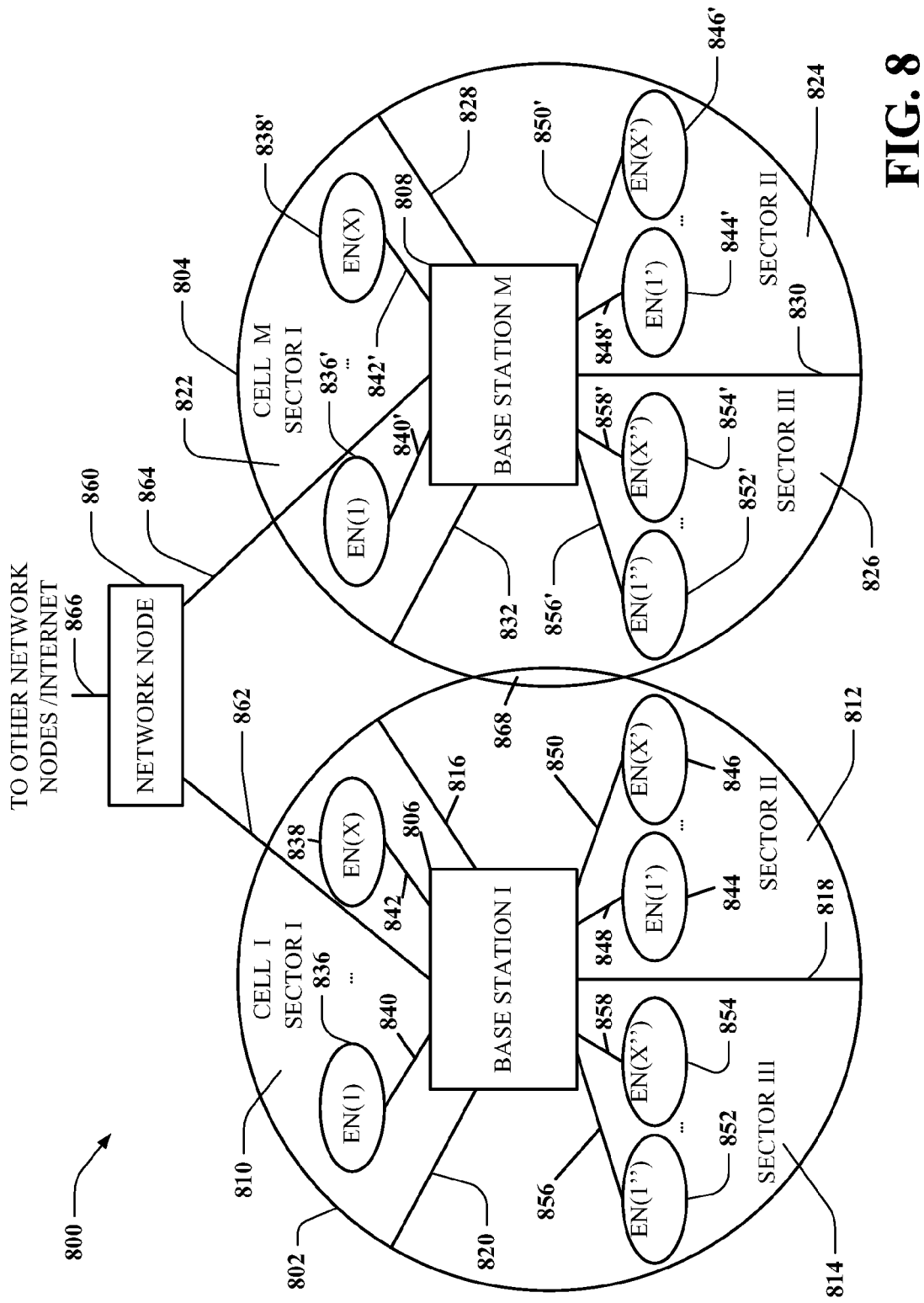
FIG. 8 is an illustration of an example communication system implemented in accordance with various aspects including multiple cells.

FIG. 8 depicts an example communication system 800 implemented in accordance with various aspects including multiple cells: cell I 802, cell M 804. Note that neighboring cells 802, 804 overlap slightly, as indicated by cell boundary region 868, thereby creating potential for signal interference between signals transmitted by base stations in neighboring cells. Each cell 802, 804 of system 800 includes three sectors. Cells which have not be subdivided into multiple sectors (N=1), cells with two sectors (N=2) and cells with more than 3 sectors (N>3) are also possible in accordance with various aspects. Cell 802 includes a first sector, sector I 810, a second sector, sector II 812, and a third sector, sector III 814. Each sector 810, 812, 814 has two sector boundary regions; each boundary region is shared between two adjacent sectors.

Sector boundary regions provide potential for signal interference between signals transmitted by base stations in neighboring sectors. Line 816 represents a sector boundary region between sector I 810 and sector II 812; line 818 represents a sector boundary region between sector II 812 and sector III 814; line 820 represents a sector boundary region between sector III 814 and sector I 810. Similarly, cell M 804 includes a first sector, sector I 822, a second sector, sector II 824, and a third sector, sector III 826. Line 828 represents a sector boundary region between sector I 822 and sector II 824; line 830 represents a sector boundary region between sector II 824 and sector III 826; line 832 represents a boundary region between sector III 826 and sector I 822. Cell I 802 includes a base station (BS), base station I 806, and a plurality of end nodes (ENs) (e.g., wireless terminals) in each sector 810, 812, 814. Sector I 810 includes EN(1) 836 and EN(X) 838 coupled to BS 806 via wireless links 840, 842, respectively; sector II 812 includes EN(1') 844 and EN(X') 846 coupled to BS 806 via wireless links 848, 850, respectively; sector III 814 includes EN(1") 852 and EN(X") 854 coupled to BS 806 via wireless links 856, 858, respectively. Similarly, cell M 804 includes base station M 808, and a plurality of end nodes (ENs) in each sector 822, 824, 826. Sector I 822 includes EN(1) 836' and EN(X) 838' coupled to BS M 808 via wireless links 840', 842', respectively; sector II 824 includes EN(1') 844' and EN(X') 846' coupled to BS M 808 via wireless links 848', 850', respectively; sector 3 826 includes EN(1") 852' and EN(X") 854' coupled to BS 808 via wireless links 856', 858', respectively.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 may be, e.g., fiber optic cables. Each end node, e.g., EN(1) 836 may be a wireless terminal including a transmitter as well as a receiver. The wireless terminals, e.g., EN(1) 836 may move through system 800 and may communicate via wireless links with the base station in the cell in which the EN is currently located. The wireless terminals, (WTs), e.g., EN(1) 836, may communicate with peer nodes, e.g., other WTs in system 800 or outside system 800 via a base station, e.g., BS 806, and/or network node 860. WTs, e.g., EN(1) 836 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 9:
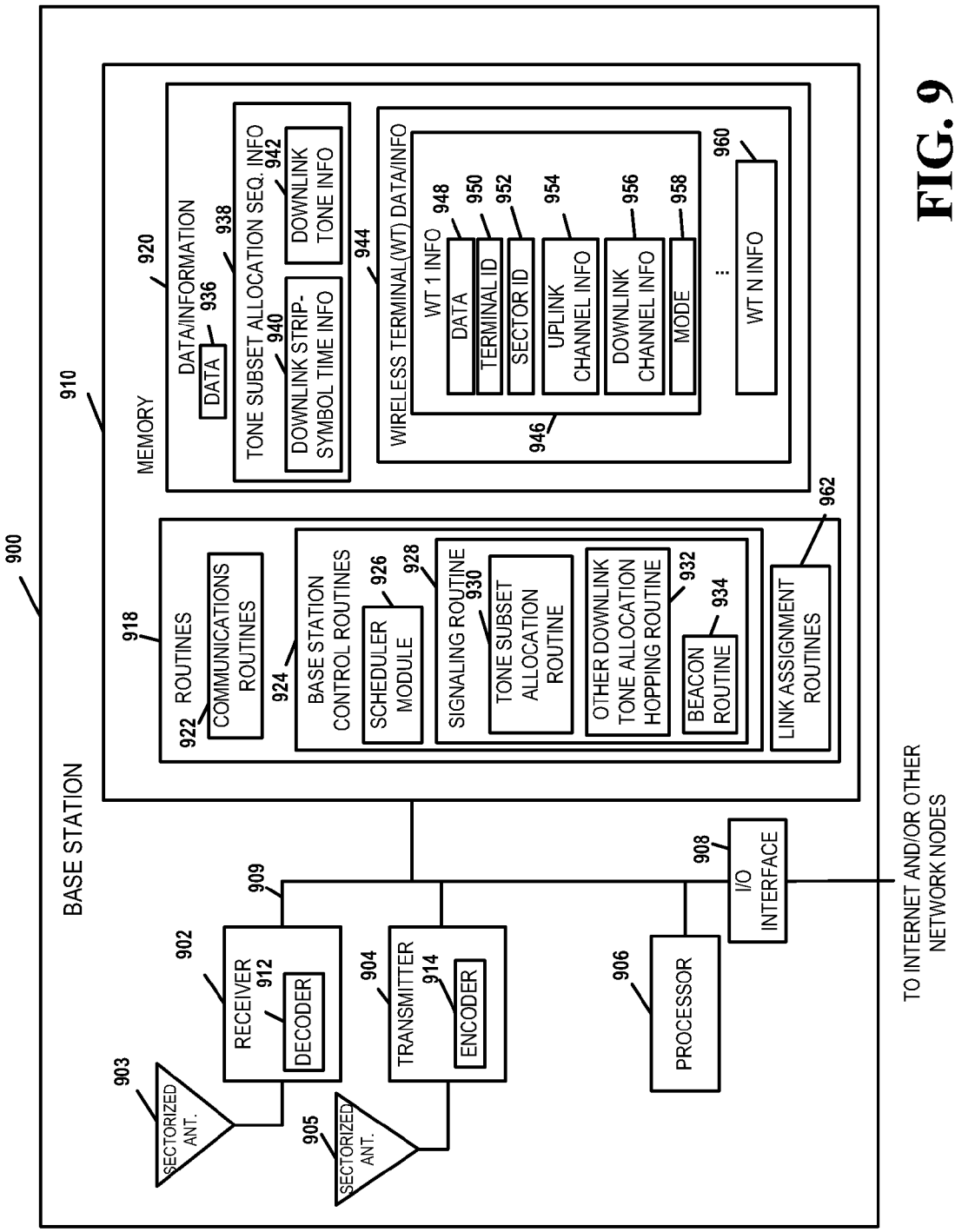
FIG. 9 is an illustration of an example base station in accordance with various aspects.

FIG. 9 illustrates an example base station 900 in accordance with various aspects. Base station 900 implements tone subset allocation sequences, with different tone subset allocation sequences generated for respective different sector types of the cell. Base station 900 may be used as any one of base stations 806, 808 of the system 800 of FIG. 8. The base station 900 includes a receiver 902, a transmitter 904, a processor 906, e.g., CPU, an input/output interface 908 and memory 910 coupled together by a bus 909 over which various elements 902, 904, 906, 908, and 910 may interchange data and information.

Sectorized antenna 903 coupled to receiver 902 is used for receiving data and other signals, e.g., channel reports, from wireless terminals transmissions from each sector within the base station's cell. Sectorized antenna 905 coupled to transmitter 904 is used for transmitting data and other signals, e.g., control signals, pilot signal, beacon signals, etc. to wireless terminals 1000 (see FIG. 10) within each sector of the base station's cell. In various aspects, base station 900 may employ multiple receivers 902 and multiple transmitters 904, e.g., an individual receiver 902 for each sector and an individual transmitter 904 for each sector. Processor 906 may be, e.g., a general purpose central processing unit (CPU). Processor 906 controls operation of base station 900 under direction of one or more routines 918 stored in memory 910 and implements the methods. I/O interface 908 provides a connection to other network nodes, coupling the BS 900 to other base stations, access routers, AAA server nodes, etc., other networks, and the Internet. Memory 910 includes routines 918 and data/information 920.

Data/information 920 includes data 936, tone subset allocation sequence information 938 including downlink strip-symbol time information 940 and downlink tone information 942, and wireless terminal (WT) data/info 944 including a plurality of sets of WT information: WT 1 info 946 and WT N info 960. Each set of WT info, e.g., WT 1 info 946 includes data 948, terminal ID 950, sector ID 952, uplink channel information 954, downlink channel information 956, and mode information 958.

Routines 918 include communications routines 922, base station control routines 924, and link assignment routines 962. Base station control routines 924 includes a scheduler module 926 and signaling routines 928 including a tone subset allocation routine 930 for strip-symbol periods, other downlink tone allocation hopping routine 932 for the rest of symbol periods, e.g., non strip-symbol periods, and a beacon routine 934. Link assignment routines 962 can further include link feedback evaluation routines (not shown) and/or flow characteristic evaluation routines (not shown).

Data 936 includes data to be transmitted that will be sent to encoder 914 of transmitter 904 for encoding prior to transmission to WTs, and received data from WTs that has been processed through decoder 912 of receiver 902 following reception. Downlink strip-symbol time information 940 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 942 includes information including a carrier frequency assigned to the base station 900, the number and frequency of tones, and the set of tone subsets to be allocated to the strip-symbol periods, and other cell and sector specific values such as slope, slope index and sector type.

Data 948 may include data that WT1 1000 has received from a peer node, data that WT 1 1000 desires to be transmitted to a peer node, and downlink channel quality report feedback information. Terminal ID 950 is a base station 900 assigned ID that identifies WT 1 1000. Sector ID 952 includes information identifying the sector in which WT1 1000 is operating. Sector ID 952 can be used, for example, to determine the sector type. Uplink channel information 954 includes information identifying channel segments that have been allocated by scheduler 926 for WT1 1000 to use, e.g., uplink traffic channel segments for data, dedicated uplink control channels for requests, power control, timing control, etc. Each uplink channel assigned to WT1 1000 includes one or more logical tones, each logical tone following an uplink hopping sequence. Downlink channel information 956 includes information identifying channel segments that have been allocated by scheduler 926 to carry data and/or information to WT1 1000, e.g., downlink traffic channel segments for user data. Each downlink channel assigned to WT1 1000 includes one or more logical tones, each following a downlink hopping sequence. Mode information 958 includes information identifying the state of operation of WT1 1000, e.g. sleep, hold, on.

Communications routines 922 control the base station 900 to perform various communications operations and implement various communications protocols. Base station control routines 924 are used to control the base station 900 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 928 controls the operation of receiver 902 with its decoder 912 and transmitter 904 with its encoder 914. The signaling routine 928 is responsible for controlling the generation of transmitted data 936 and control information. Tone subset allocation routine 930 constructs the tone subset to be used in a strip-symbol period using the method of the aspect and using data/information 920 including downlink strip-symbol time info 940 and sector ID 952. The downlink tone subset allocation sequences will be different for each sector type in a cell and different for adjacent cells. The WTs 1000 receive the signals in the strip-symbol periods in accordance with the downlink tone subset allocation sequences; the base station 900 uses the same downlink tone subset allocation sequences in order to generate the transmitted signals. Other downlink tone allocation hopping routine 932 constructs downlink tone hopping sequences, using information including downlink tone information 942, and downlink channel information 956, for the symbol periods other than the strip-symbol periods. The downlink data tone hopping sequences are synchronized across the sectors of a cell. Beacon routine 934 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Link assignment routines 962 can further include link feedback evaluation routines (not shown) and/or flow characteristic evaluation routines (not shown). Link related feedback can be evaluated to determine characteristics of available links. Further, a service class associated with a flow to be transferred can be reviewed to identify flow related characteristics. Moreover, link assignment routines 962 can control assigning the flow to a link based upon the link characteristics and the flow characteristics.

Figure 10:
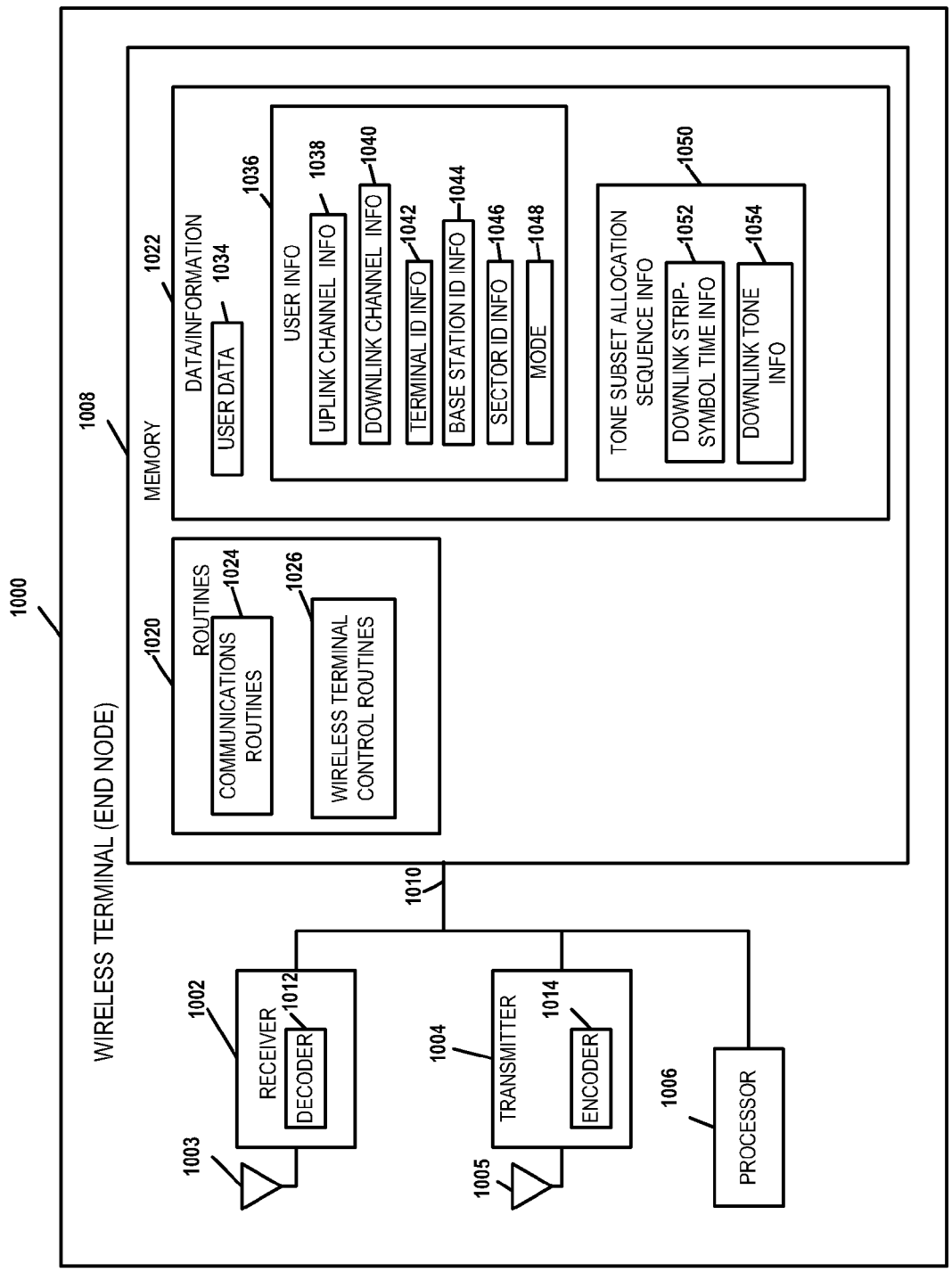
FIG. 10 is an illustration of an example wireless terminal (e.g., mobile device, end node, . . . ) implemented in accordance with various aspects described herein.

FIG. 10 illustrates an example wireless terminal (e.g., end node, mobile device, . . . ) 1000 which can be used as any one of the wireless terminals (e.g., end nodes, mobile devices, . . . ), e.g., EN(1) 836, of the system 800 shown in FIG. 8. Wireless terminal 1000 implements the tone subset allocation sequences. Wireless terminal 1000 includes a receiver 1002 including a decoder 1012, a transmitter 1004 including an encoder 1014, a processor 1006, and memory 1008 which are coupled together by a bus 1010 over which the various elements 1002, 1004, 1006, 1008 can interchange data and information. An antenna 1003 used for receiving signals from a base station 900 (and/or a disparate wireless terminal) is coupled to receiver 1002. An antenna 1005 used for transmitting signals, e.g., to base station 900 (and/or a disparate wireless terminal) is coupled to transmitter 1004.

The processor 1006 (e.g., a CPU) controls operation of wireless terminal 1000 and implements methods by executing routines 1020 and using data/information 1022 in memory 1008.

Data/information 1022 includes user data 1034, user information 1036, and tone subset allocation sequence information 1050. User data 1034 may include data, intended for a peer node, which will be routed to encoder 1014 for encoding prior to transmission by transmitter 1004 to base station 900, and data received from the base station 900 which has been processed by the decoder 1012 in receiver 1002. User information 1036 includes uplink channel information 1038, downlink channel information 1040, terminal ID information 1042, base station ID information 1044, sector ID information 1046, and mode information 1048. Uplink channel information 1038 includes information identifying uplink channels segments that have been assigned by base station 900 for wireless terminal 1000 to use when transmitting to the base station 900. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1040 includes information identifying downlink channel segments that have been assigned by base station 900 to WT 1000 for use when BS 900 is transmitting data/information to WT 1000. Downlink channels may include downlink traffic channels and assignment channels, each downlink channel including one or more logical tone, each logical tone following a downlink hopping sequence, which is synchronized between each sector of the cell.

User info 1036 also includes terminal ID information 1042, which is a base station 900 assigned identification, base station ID information 1044 which identifies the specific base station 900 that WT has established communications with, and sector ID info 1046 which identifies the specific sector of the cell where WT 1000 is presently located. Base station ID 1044 provides a cell slope value and sector ID info 1046 provides a sector index type; the cell slope value and sector index type may be used to derive tone hopping sequences. Mode information 1048 also included in user info 1036 identifies whether the WT 1000 is in sleep mode, hold mode, or on mode.

Tone subset allocation sequence information 1050 includes downlink strip-symbol time information 1052 and downlink tone information 1054. Downlink strip-symbol time information 1052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1054 includes information including a carrier frequency assigned to the base station 900, the number and frequency of tones, and the set of tone subsets to be allocated to the strip-symbol periods, and other cell and sector specific values such as slope, slope index and sector type.

Routines 1020 include communications routines 1024 and wireless terminal control routines 1026. Communications routines 1024 control the various communications protocols used by WT 1000. By way of example, communications routines 1024 may enable receiving a broadcast signal (e.g., from base station 900). Wireless terminal control routines 1026 control basic wireless terminal 1000 functionality including the control of the receiver 1002 and transmitter 1004.

Figure 11:
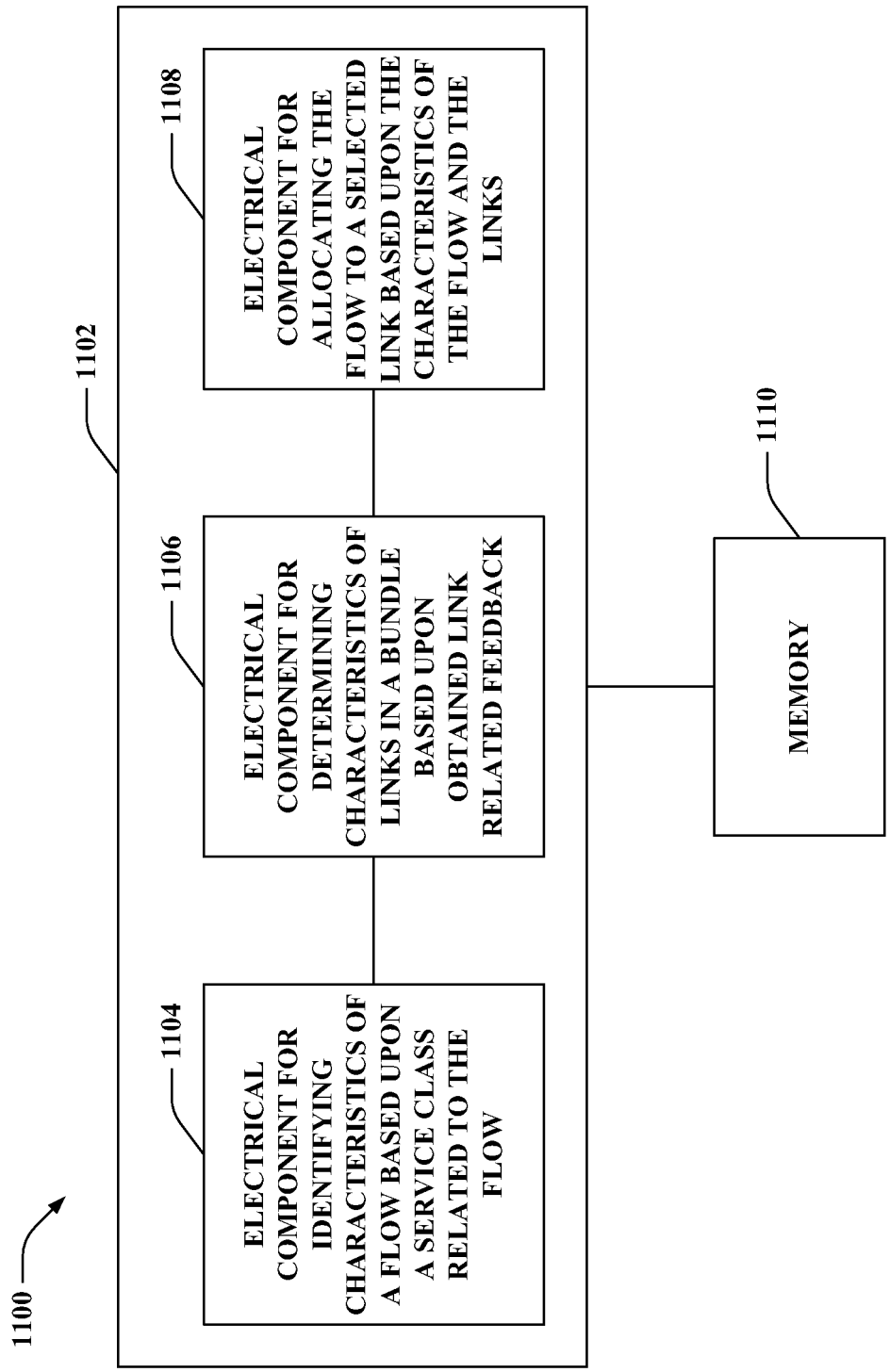
FIG. 11 is an illustration of an example system that enables assigning flows to links to dynamically balance load within a wireless communication environment.

With reference to FIG. 11, illustrated is a system 1100 that enables assigning flows to links to dynamically balance load within a wireless communication environment. For example, system 1100 may reside at least partially within a base station. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for identifying characteristics of a flow based upon a service class related to the flow 1104. Pursuant to an illustration, the service class can provide flow characteristics pertaining to minimum bandwidth, maximum bandwidth, latency tolerance, loss tolerance, compression, and the like. Further, logical grouping 1102 can comprise an electrical component for determining characteristics of links in a bundle based upon obtained link related feedback 1106. For example, link quality, throughput, bandwidth, speed, lossiness, and the like can be evaluated by utilizing a feedback loop. Moreover, logical grouping 1102 can include an electrical component for allocating the flow to a selected link based upon the characteristics of the flow and the links 1108. By way of illustration, utilization of link availability can be optimized by considering characteristics of the flow and the links when generating assignments. Additionally, system 1100 may include a memory 1110 that retains instructions for executing functions associated with electrical components 1104, 1106, and 1108. While shown as being external to memory 1110, it is to be understood that one or more of electrical components 1104, 1106, and 1108 may exist within memory 1110.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a mobile wireless communications device, comprising:
    evaluating, in said mobile wireless communications device, a service class related to a flow directed to a base station to determine flow characteristics;
    analyzing, in said mobile wireless communications device when said mobile wireless communications device is connected via wireless links from the mobile wireless communications device to the base station to which flows can be assigned on an individual per link basis by the mobile wireless communications device, feedback from said wireless links to identify link characteristics, said wireless links being in a bundle of links between the mobile wireless communications device and the base station; and assigning the flow to a selected wireless link in the bundle based upon the flow characteristics and the link characteristics;
    assigning an additional flow to the selected wireless link; and
    scheduling said flow and said additional flow over said selected wireless link as a function of a link sharing weight corresponding to said flow and an additional link sharing weight corresponding to said additional flow; wherein a larger percentage of the overall bandwidth of said selected wireless link is allotted by said mobile wireless communications device to one of said flow and said additional flow having the larger link sharing weight.

2. The method of operating a mobile wireless communications device of claim 1, wherein said flow and said additional flow correspond to different types of data, the sharing weight corresponding to said flow being a function of the type of data included in said flow, the additional sharing weight corresponding to said additional flow being a function of the type of data included in said additional flow.

3. The method of operating a mobile wireless communications device of claim 2, wherein said type of data included in said flow is voice data and wherein the type of data included in said additional flow is video data.

4. The method of operating a mobile wireless communications device of claim 1, wherein assigning the flow to a selected wireless link from the bundle based upon the flow characteristics includes:
assigning the flow to multiple wireless links at the same time, said multiple wireless links being some of said wireless links from the mobile wireless communications device to the base station to which flows can be assigned on an individual per link basis, said selected wireless link being one of said multiple wireless links.

5. The method of operating a mobile wireless communications device of claim 4, wherein packets from said flow are directed to the same destination, packets from said flow traversing said multiple wireless links, at least one of said multiple wireless links providing a redundant path to said destination.

6. The method of operating a mobile wireless communications device of claim 1, wherein evaluating a service class related to a flow to determine flow characteristics includes identifying at least one of a minimum bandwidth, a maximum bandwidth, a latency tolerance, a loss tolerance or an availability of compression related to the flow.

7. The method of operating a mobile wireless communications device of claim 1, further comprising:
monitoring link quality feedback information to determine when the selected wireless link becomes more lossy due to a change in the quality of the selected wireless link; and reassigning the flow to a different wireless link in response to determining that the selected wireless link has become more lossy.

8. The method of operating a mobile wireless communications device of claim 1, further comprising:
assessing link related feedback subsequent to assigning the flow to the selected wireless link; and
moving the flow to a second wireless link in said bundle based upon a change identified from link related feedback.

9. The method of operating a mobile wireless communications device of claim 1, further comprising:
similarly loading wireless links with substantially similar link characteristics.

10. A mobile wireless communications device comprising:
means for evaluating a service class related to a flow directed to a base station to determine flow characteristics;
means for analyzing, when said mobile wireless communications device is connected via wireless links from the mobile wireless communications device to the base station to which flows can be assigned on an individual per link basis by the mobile wireless communications device, feedback from said wireless links to identify link characteristics, said wireless links being in a bundle of links between the mobile wireless communications device and the base station; and
means for assigning the flow to a selected wireless link in the bundle based upon the flow characteristics and the link characteristics;
wherein said means for assigning the flow to a selected wireless link is also for assigning an additional flow to the selected wireless link, said mobile wireless communications device further comprising:
means for scheduling said flow and said additional flow over said selected wireless link as a function of a link sharing weight corresponding to said flow and an additional link sharing weight corresponding to said additional flow; wherein a larger percentage of the overall bandwidth of said selected wireless link is allotted by said mobile wireless communications device to one of said flow and said additional flow having the larger link sharing weight.

11. The mobile wireless communications device of claim 10, wherein said flow and said additional flow correspond to different types of data, the sharing weight corresponding to said flow being a function of the type of data included in said flow, the additional sharing weight corresponding to said additional flow being a function of the type of data included in said additional flow.

12. The mobile wireless communications device of claim 10, wherein said means for assigning the flow to a selected wireless link from the bundle based upon the flow characteristics is also for assigning the flow to multiple wireless links at the same time, said selected wireless link being one of said multiple wireless links.

13. The mobile wireless communications device of claim 12, wherein packets from said flow are directed to the same destination, packets from said flow traversing said multiple wireless links, at least one of said multiple wireless links providing a redundant path to said destination.

14. A mobile wireless communications device comprising:
a transmitter for transmitting data;
an evaluation module for evaluating a service class related to a flow directed to a base station to determine flow characteristics;
an analyzer module for analyzing, when said mobile wireless communications device is connected via wireless links from the mobile wireless communications device to the base station to which flows can be assigned on an individual per link basis by the mobile wireless communications device, feedback from said wireless links to identify link characteristics, said wireless links being in a bundle of links; and a link assigner module for assigning the flow to a selected wireless link in the bundle based upon the flow characteristics and the link characteristics; wherein said assigner module is also for assigning an additional flow to the selected wireless link; and
wherein said mobile wireless communications device further includes a module for scheduling said flow and said additional flow over said selected wireless link as a function of a link sharing weight corresponding to said flow and an additional link sharing weight corresponding to said additional flow;
wherein a larger percentage of the overall bandwidth of said selected wireless link is allotted by said mobile wireless communications device to one of said flow and said additional flow having the larger link sharing weight.

15. The mobile wireless communications device of claim 14, wherein said flow and said additional flow correspond to different types of data, the sharing weight corresponding to said flow being a function of the type of data included in said flow, the additional sharing weight corresponding to said additional flow being a function of the type of data included in said additional flow.

16. A non-transitory computer readable medium having stored thereon machine-executable instructions, for use in a mobile wireless communications device, said non-transitory computer readable medium comprising:
instructions for causing said mobile wireless communications device to evaluate a service class related to a flow directed to a base station to determine flow characteristics;

instructions for causing said mobile wireless communications device to analyze, when said mobile wireless communications device is connected via wireless links from the mobile wireless communications device to the base station to which flows can be assigned on an individual per link basis by the mobile wireless communications device, feedback from said wireless links to identify link characteristics, said wireless links being in a bundle of links; and instructions for causing said mobile wireless communications device to assign the flow to a selected wireless link in the bundle based upon the flow characteristics and the link characteristics;

instructions for causing said mobile wireless communications device to assign an additional flow to the selected wireless link; and instructions for causing said mobile wireless communications device to schedule said flow and said additional flow over said selected wireless link as a function of a link sharing weight corresponding to said flow and an additional link sharing weight corresponding to said additional flow; wherein a larger percentage of the overall bandwidth of said selected wireless link is allotted by said mobile wireless communications device to one of said flow and said additional flow having the larger link sharing weight.

17. A mobile wireless communications device comprising:
a processor configured to: evaluate a service class related to a flow directed to a base station to determine flow characteristics; analyze, when said mobile wireless communications device is connected via wireless links from the mobile wireless communications device to the base station to which flows can be assigned on an individual per link basis by the mobile wireless communications device, feedback from said wireless links to identify link characteristics, said wireless links being in a bundle of links; and assign the flow to a selected wireless link in the bundle based upon the flow characteristics and the link characteristics; wherein said processor is further configured to:
assign an additional flow to the selected wireless link; and
schedule said flow and said additional flow over said selected wireless link as a function of a link sharing weight corresponding to said flow and an additional link sharing weight corresponding to said additional flow; wherein a larger percentage of the overall bandwidth of said selected wireless link is allotted by said mobile wireless communications device to one of said flow and said additional flow having the larger link sharing weight.

18. The method of claim 4 wherein said assignment of the flow to multiple wireless links is performed as a function of device movement.

19. The method of claim 1, wherein said mobile wireless communications device is one of a user terminal or user equipment.

20. The mobile wireless communications device of claim 10, wherein said mobile wireless communications device is one of a user terminal or user equipment.

21. The mobile wireless communications device of claim 17, wherein said mobile wireless communications device is one of a user terminal or user equipment.

22. The method of claim 1, wherein said assigning is performed as part of a load balancing operation performed by said mobile wireless communications device to balance the load on said wireless links in said bundle.

23. The method of claim 22,
monitoring wireless link quality of said selected wireless link to identify a change in link quality; and
reassigning the flow, following assignment of said flow to the selected wireless link, to a different link in said bundle in response to identifying a change in the quality of said selected wireless link.

* * * * *